358-190. OR 2,974,191 SR
SEARCH ROOM
March 7, 1961 A. COTSWORTH, III ET AL 2,974,191
TELEVISION RECEIVER COMPENSATING CIRCUIT
Filed Dec. 1, 1954
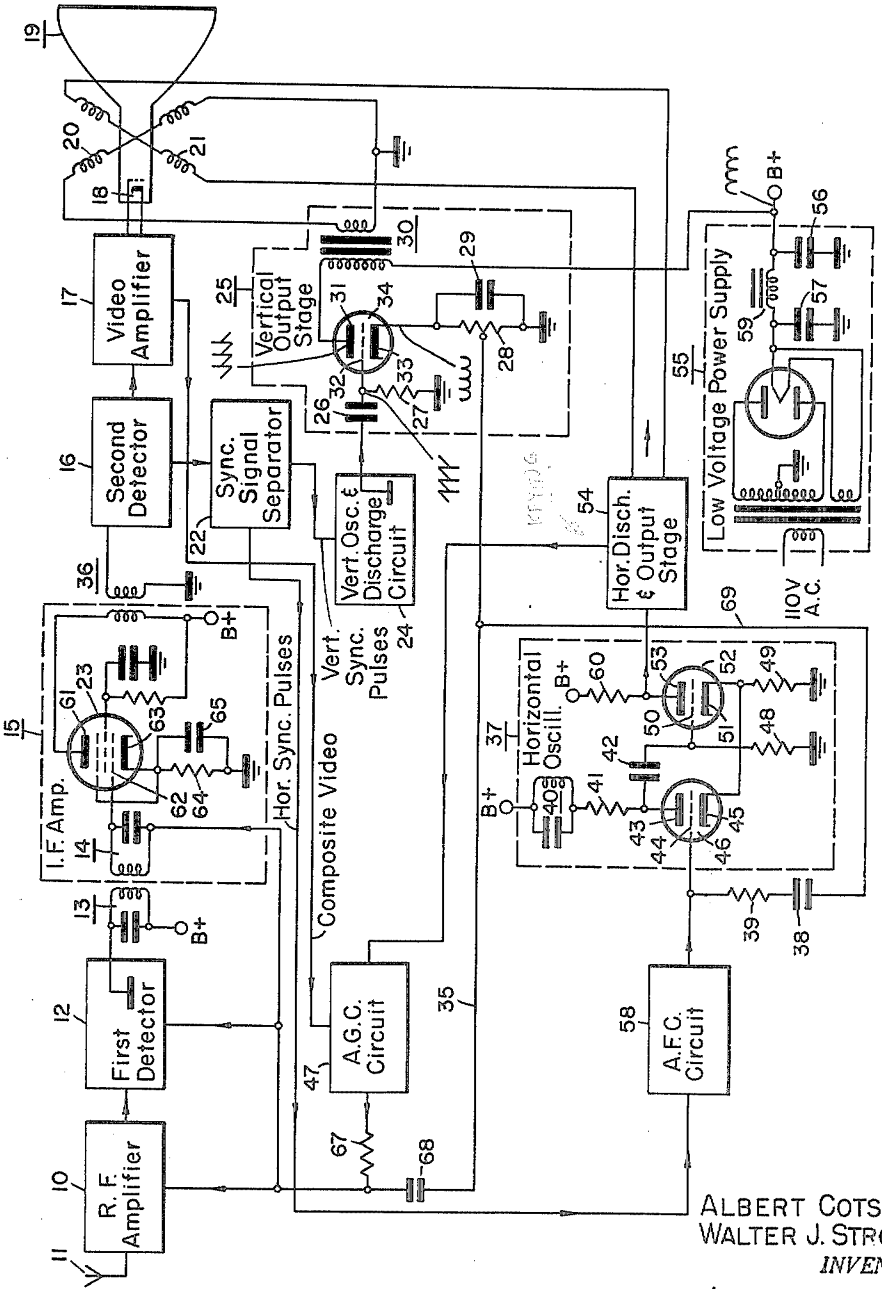
T5117
X5097
X5081
Rh
ALBERT COTSWORTH III
WALTER J. STROH
*INVENTORS.*
BY Francis W. Crotty
THEIR ATTORNEY.

2,974,191

TELEVISION RECEIVER COMPENSATING CIRCUIT

Albert Cotsworth III, Oak Park, and Walter J. Stroh, Barrington, Ill., assignors to Zenith Radio Corporation, a corporation of Delaware Filed Dec. 1, 1954, Ser. No. 472,304

4 Claims. (Cl. 178—7.3)

This invention relates in general to a television receiver and more particularly to a compensation circuit for compensating or nullifying certain effects of undesired supply voltage variations in such a receiver.

In the past, it has been customary to employ a relatively high-capacitance condenser, usually of the electrolytic type, in the vertical sweep output stage of a television receiver to by-pass the low-frequency vertical deflection signal around the B voltage supply to assure that an alternating component at the vertical sweep frequency is not superimposed upon the B potential as supplied to the several stages of the receiver. The presence of such extraneous A.C. components may undesirably affect the operation of the receiver in numerous ways. For example, a "ripple" in the B potential at the vertical scanning rate (60 cycles per second under present United States standards) when applied to an IF (intermediate-frequency) amplifier of the type to which automatic gain control (AGC) is applied results in a variation in gain of the receiver to the extent that the background level of the reproduced image noticeably varies in level or intensity over different portions of the image. As another example, if the B potential applied to the horizontal scanning oscillator of an automatic-frequency-controlled (AFC) synchronizing system varies to a relatively high degree, the horizontal scanning frequency may vary correspondingly, so that the time relationship between the horizontal-deflection signal for each line-trace interval and the associated video information may vary at the vertical deflection rate. Consequently, the image reproduced on the picture tube appears "bowed" from top to bottom as the phase of each line trace with respect to the corresponding incoming line-synchronizing pulse is altered.

Of course, it should be realized that the undesired A.C. signal may also be rendered ineffective by employing an extremely large filter condenser in the B supply; this is impractical for obvious economical reasons.

It is an important object of the present invention to provide a television receiver less expensive than those of the past without detracting from the performance or quality.

It is a more specific object of the invention to provide a compensating circuit for use in a television receiver to compensate the effect on the operation of the receiver of undesired B voltage variations arising when the vertical deflection signal developed in the vertical sweep output stage is permitted to pass through the B potential source.

A television receiver constructed in accordance with the invention comprises a vertical sweep output stage which includes an electron-discharge device, a load circuit and a source of unidirectional potential connected in series for translating a deflection signal of pulsed sawtooth wave form through the load circuit. The potential source includes a filter condenser which, in response to the deflection signal, has a tendency to superpose a component of parabolic wave form on the unidirectional potential. A D.C.-controlled stage is provided for varying an operating characteristic of the receiver in accordance with an applied control signal and includes an electron-discharge device having an anode coupled to the source and having a plurality of other electrodes. Means is provided for applying a D.C. control signal to one of the other electrodes. Finally, the receiver comprises an integrating network included in the aforesaid load circuit for deriving therefrom and for applying to one of the other electrodes of the D.C. controlled stage a signal of parabolic wave form to compensate the parabolic component of the unidirectional potential on receiver operation.

The features of this invention which are believed to be new are set forth with particularity in the appended claims. The invention, together with further objects and advantages thereof, may best be understood, however, by reference to the following description in conjunction with the accompanying drawing, in which the single figure is a schematic representation of a television receiver incorporating the invention.

The television receiver illustrated includes a radio-frequency amplifier 10 having its input circuit connected to an antenna 11 and its output circuit connected to a first detector 12. The anode of the electron-discharge device normally employed in first detector 12 is connected through a parallel-resonant tuned circuit 13 to a source of positive unidirectional operating potential, conventionally designated B+. The coil of another parallel-resonant tuned circuit 14, which is actually the secondary winding of an IF transformer, is inductively coupled to the coil of tuned circuit 13, which is the primary winding, to derive the intermediate-frequency signal from first detector 12 for application to the control grid 62 of an electron-discharge device 23 (shown as a conventional pentode) included in an intermediate-frequency amplifier 15. While only one stage of intermediate-frequency amplification has been shown, it should be understood that as many as desired may be used. Cathode 63 of device 23 is connected to ground via a resistor 64 which is shunted by a by-pass condenser 65. The anode 61 of electron-discharge device 23 is connected through the primary winding of an IF transformer 36 to B+. One terminal of the secondary winding of IF transformer 36 is connected to ground and the other terminal is connected to second detector 16 which has an output circuit connected to a video amplifier 17. The output terminals of video amplifier 17 are connected to the input electrodes 18 of an image-reproducing device such as a cathode-ray tube 19.

Second detector 16 is also connected to a synchronizing-signal separator 22 which has an output circuit coupled to a vertical or field-frequency oscillator and discharge circuit 24 to supply vertical-synchronizing pulses thereto. The anode of the discharge tube conventionally employed in unit 24 is coupled through a condenser 26 to the control grid 32 of an electron-discharge device 34 (shown as a conventional triode) included in a vertical sweep output stage 25, control grid 32 being returned to ground through a grid-leak resistor 27. The cathode 33 of device 34 is connected to ground, which is the low potential terminal of the B supply, through a cathode-bias resistor 28 that is shunted by a cathode by-pass condenser 29. The anode 31 of device 34 is coupled through the primary winding of a vertical-output transformer 30 to B+ and the secondary winding of this transformer is coupled to the vertical deflection elements 20 associated with image reproducer 19. One side of the secondary winding is grounded. Units 24 and 25 constitute a vertical sweep system. An examination of the specific circuitry of vertical sweep output stage 25 reveals that it is nothing more than an amplifier for amplifying a received pulsed sawtoothed shaped signal for application to the vertical deflection coils 20 to effect vertical scansion of picture tube 19. It will also be noted that the primary winding of output transformer 30 is connected directly to B+ and that no by-pass condenser is utilized to prevent the pulsed saw-tooth signals, amplified by that stage, from passing through the B-voltage power supply.

Synchronizing-signal separator 22 has another output circuit connected to an AFC (automatic frequency control) circuit 58 to supply horizontal-synchronizing pulses thereto. The output circuit of unit 58 is connected to the control grid 44 of an electron-discharge device 46 (shown as a triode) included in a horizontal or line-frequency oscillator 37. In accordance with the invention, the AFC filter resistor 39 and filter condenser 38 across the output of AFC network 58 are returned to a point along cathode resistor 28 of vertical output stage 30 for reasons which will become apparent hereinafter. The anode 43 of device 46 is connected through a load resistor 41 and a parallel-resonant tuned circuit 40 to B+. The cathode 45 of device 46 is connected to the cathode 51 of another electron discharge device 52 (also shown as a triode), and both cathodes 45 and 51 are connected to ground through a common cathode resistor 49. Anode 43 of device 46 is also coupled to control grid 50 of device 52 through a coupling condenser 42, control grid 50 being returned to ground through a grid-leak resistor 48. Anode 53 of device 52 is connected through a load resistor 60 to B+ and also to the input circuit of a horizontal discharge and sweep output stage 54 which has its output terminals connected to horizontal deflection elements 21 associated with image reproducer 19. It will be noted that horizontal oscillator 37 is nothing more than a conventional resonant-stabilized cathode-coupled multivibrator which is employed to produce horizontal-drive pulses, which are in synchronism with the received horizontal-synchronizing pulses, for application to horizontal discharge and output stage 54 to develop the proper horizontal-scanning signal for picture tube 19.

An AGC (automatic gain control) circuit 47 has one input circuit connected to video amplifier 17 to derive a composite video signal therefrom and another input circuit connected to horizontal discharge and output stage 54 to derive keying or gating pulses. The AGC circuit is connected by way of a series-connected resistor 67 and a shunt-connected condenser 68, which collectively constitute an AGC output filter, to input circuits of radio-frequency amplifier 10 and first detector 12, specifically to the control grids of the electron-discharge devices (not shown) conventionally employed in such stages, and also through tuned circuit 14 to control grid 62 of device 23 in IF amplifier 15. In accordance with the invention, condenser 68 is returned to ground through a portion of cathode resistor 28 of vertical output stage 30 for reasons which will become apparent hereinafter. Circuit 47 may be constructed in any conventional manner so that it responds to the instantaneous amplitude of the synchronizing components of the composite video signal when it is keyed or gated on by the pulses from unit 54 to produce a D.C. control voltage for varying the gain of stages 10, 12 and 15 in accordance with the relative strength or intensity of the received television signal.

The B-voltage source, which is actually the low-voltage power supply as distinguished from the high-voltage supply (not specifically shown) required for the second anode of the picture tube, is illustrated as unit 55. It will be appreciated that this circuit as shown is a conventional fullwave rectifier which may be connected to any 110-volt A.C. power outlet to develop the proper D.C. potential for the various stages of the television receiver. Condensers 56 and 57 and coil 59 comprise a conventional $\pi$-type filter for removing residual sixty-cycle ripple or hum.

In accordance with the invention, in order to compensate the deleterious effect of the vertical deflection component which modulates the B supply voltage due to the absence of a by-pass condenser in stage 25, a conductor 35 is provided to connect a point along cathode resistor 28 of vertical output stage 25 to the gain control input circuits of RF amplifier 10, first detector 12 and intermediate-frequency amplifier 15 via AGC filter condenser 68, and a conductor 69 is provided to connect the same point to control grid 44 of device 46 via AFC filter condenser 38 and resistor 39.

In general, the operation of the illustrated television receiver is well understood. A received television signal is interecepted by antenna 11, amplified in radio-frequency amplifier 10, and heterodyned to the selected intermediate frequency in first detector 12. The resulting intermediate-frequency signal is amplified in intermediate-frequency amplifier 15 and detected in second detector 16 to produce a composite video signal. This latter signal is amplified in video amplifier 17 and impressed on the input electrodes 18 of image-reproducing device 19 to control the intensity of the cathode-ray beam of the device in well known manner.

The horizontal- and vertical-synchronizing components of the received television signal are separated from the composite video signal in synchronizing-signal separator 22 and utilized to synchronize the horizontal and vertical scansion of device 19. More specifically, the vertical-synchronizing pulses are derived in separator 22 and applied to vertical oscillator and discharge circuit 24 to produce a pulsed saw-tooth shaped signal in conventional manner for application to control grid 32 of vertical sweep output stage 25, as shown by the wave form indicated at the junction between condenser 26 and resistor 27. This pulsed saw-tooth signal is amplified in device 34 to form the inverted signal as shown at anode 31 for application to the primary winding of output transformer 30 and by transformer action to vertical deflection coils 20 to control the vertical scansion of the electron beam.

Horizontal-synchronizing pulses are also derived from separator 22 and applied to AFC circuit 58 to provide an AFC control voltage in well known manner which varies in magnitude with variations in the phase relation between the horizontal-sync pulses and the locally generated line-drive pulses. The control voltage is applied to control grid 44 of device 46 to control the frequency of operation of oscillator 37 and consequently the timing of the horizontal-drive pulses supplied to horizontal discharge and sweep output stage 54. As is conventional in present-day AFC controlled horizontal oscillators, if there is a variation in phase between the received sync pulses and the sweep signal developed by the discharge stage 54, a control voltage is developed in AFC circuit 58 to adjust the frequency of operation of oscillator 37 to compensate for such variation. Dicharge and output stage 54 responds to the pulses supplied thereto from oscillator 37 to produce a saw-tooth shaped signal for application to horizontal deflection coils 21 to control the horizontal scansion of the beam of picture tube 19.

The operation of the receiver in accordance with the present invention will now be considered. Due to the fact that a by-pass condenser is not provided to shunt the pulsed saw-tooth shaped signal, as shown at anode 31, around the low-voltage power supply 55, an undesired alternating signal component having the same frequency as the vertical-deflection signal is superimposed on the B supply voltage. This unwanted B-voltage modulation does not take the same form as the pulsed saw-tooth wave used for vertical scanning because of the integrating action of filter condenser 56 in power supply 55. Consequently, the integrated saw-tooth signal appears as a parabolic signal as indicated at the high potential or B+ terminal of power supply 55.

The parabolic B-voltage component, in the absence of compensation, causes the gain of IF amplifier 15 to vary at the vertical scanning rate. Actually, while an alteration or ripple of the B voltage is detrimental in the operation of each stage of the television receiver, it has a decided effect on the operation of an AGC controlled stage.

This obtains since an AGC controlled stage is operated close to cut-off at the curved portion of the *ip-eg* or grid-plate transfer characteristic in order to realize variations in gain with variations in AGC control potential level. When operating over the curved portion of this characteristic, variations in anode or screen voltage effect considerable changes in transconductance which results in corresponding changes in gain.

The present invention compensates or balances out any tendency to vary the gain with variations in B voltage by deriving from the vertical sweep output stage itself a signal having substantially the same wave shape as the undesired modulation of the B voltage and applying this signal to the control grid 62 of intermediate-frequency amplifier 15 with the proper magnitude and phase, specifically in the opposite phase, to compensate the undesired effects of the parabolic B voltage variation. Thus as the gain tends to decrease due to a decreasing B voltage on the anode, the potential on the control grid increases sufficiently to maintain the gain constant. The proper signal is derived from vertical output stage 25 by connection to a tap on cathode resistor 28 and is impressed via conductor 35 and tuned circuit 14 on control grid 62 of device 23. The signal developed in resistor 28 has the wave shape indicated at cathode 33, which is 180° out of phase with the wave shown at the high-potential terminal of power supply 55, and not a pulsed saw-tooth as shown at anode 31 because of the integrating effect of cathode by-pass condenser 29. Consequently, the cathode circuit or load impedance connected between cathode 33 and ground provides a very convenient source of compensating signal to nullify the effect of the undesired modulation of the B-voltage supply.

The effect of variations or ripple in the B voltage on the operation of the horizontal oscillator 37 is also compensated in much the same manner. As the voltage varies on anodes 43 and 53 of oscillator 37, the operational frequency being a function of the anode or plate potential varies accordingly. The compensating signal from cathode resistor 28 is thus supplied over conductor 69, condenser 38 and resistor 39 to control grid 44 of device 46 and inasmuch as the operational frequency of oscillator 37 is also a function of the control grid potential, the frequency is varied in an opposite sense by the compensating signal which is in frequency synchronism with the B voltage variations but in opposite phase. It may be necessary to derive the compensating signal for oscillator 37 from a different point along resistor 28, depending on the amplitude required to effect exact compensation.

In the illustrated embodiment, the desired compensation is effected by applying a compensating signal in phase opposition with the unwanted modulation to the control grid of a D.C.-controlled stage. Equivalent results may be achieved by applying a compensating voltage in phase with the undesired modulation to the cathode of the affected stage.

By way of summary, the television receiver shown comprises a vertical sweep output stage 25 which includes an electron-discharge device 34, a load circuit including output transformer 30, vertical deflection coils 20, cathode resistor 28 and cathode by-pass condenser 29, and a source of unidirectional potential, namely power supply 55, connected in series for translating an alternating vertical deflection signal through the load circuit to effect vertical scansion of picture tube 19. However, this straight series connection in the absence of any shunting condensers around power supply 55 results in the tendency of the vertical deflection signal to effect modulation of the unidirectional operating potential. The receiver includes a D.C.-controlled stage, for example intermediate-frequency amplifier 15 or horizontal oscillator 37, for varying an operating characteristic (gain or horizontal sweep frequency) of the receiver in accordance with an applied control signal, that is, an applied AGC or AFC signal. The D.C.-controlled stage includes an electron-discharge device (23 or 46) having an anode (61 or 43) coupled to source 55 and further having a plurality of other electrodes, such as control grid 62 or 44 and cathode 63 or 45. Means (AGC circuit 47 or AFC circuit 58) is provided for applying a D.C. control signal to one of the other electrodes, such as control grid 62 or 44. Finally, the television receiver includes means (conductor 35) for deriving from the load circuit, namely from cathode resistor 28, and for applying to one of the other electrodes, such as control grid 62 or 44, a signal representing the modulation to compensate the effect of the modulation.

The invention provides, therefore, a television receiver which does not require a relatively costly by-pass condenser to shunt the vertical deflection signal around the B voltage supply, and yet the effect of the vertical deflection component thereby introduced in the B voltage is compensated in an economical manner.

While particular embodiments of the invention have been shown and described, modifications may be made, and it is intended in the appended claims to cover all such modifications as may fall within the true spirit and scope of the invention.

We claim:

1. A television receiver comprising: a vertical sweep output stage including an electron-discharge device, a load circuit and a source of a unidirectional potential connected in series for translating a deflection signal of pulsed sawtooth wave form through said load circuit, said potential source including a filter condenser which in response to said deflection signal has a tendency to superpose a component of parabolic wave form on said unidirectional potential; a D.C.-controlled stage for varying an operating characteristic of said receiver in accordance with an applied control signal and including an electron-discharge device having an anode coupled to said source and further having a plurality of other electrodes; means for applying a D.C. control signal to one of said other electrodes; and an integrating network included in said load circuit for deriving therefrom and for applying to one of said other electrodes a signal of parabolic wave form to compensate said parabolic component of said unidirectional potential.

2. A television receiver comprising: a vertical sweep output stage including an electron-discharge device having an anode and a cathode, a source of unidirectional potential having a low and a high potential terminal, a first load impedance connected between the anode of said electron-discharge device and the high potential terminal of said source, and a second load impedance connected between the low potential terminal of said source and the cathode of said electron-discharge device, for translating a vertical deflection signal of pulsed sawtooth wave form through said first and second load impedances, said potential source including a filter condenser which in reponse to said deflection signal has a tendency to superpose a component of parabolic wave form on said unidirectional potential; a D.C.-controlled stage for varying an operating characteristic of said receiver in accordance with an applied control signal and including another electron-discharge device having an anode coupled to said source and a control grid; means for applying a D.C. control signal to the control grid of said other electron-discharge device; and a circuit coupling a point on said second load impedance to the control grid of said other electron-discharge device and said second load impedance comprising an integrating network for developing a signal of parabolic wave form but in opposite phase relative to said parabolic component of said unidirectional potential to compensate the effect of said component on said other discharge device.

3. A television receiver comprising: a vertical sweep output stage including an electron-discharge device, a load circuit and a source of unidirectional potential connected in series for translating a vertical deflection signal of pulsed sawtooth wave form through said load circuit, said potential source including a filter condenser which in response to said deflection signal has a tendency to superpose a component of parabolic wave form on said unidirectional potential; an AGC-controlled intermediate amplifier for varying the gain of said receiver in accordance with an applied AGC control signal and including another electron-discharge device having an anode coupled to said source and a control grid; means for supplying an AGC control signal to the control grid of said other electron-discharge device; and an integrating network included in said load circuit for deriving therefrom and for applying to the control grid of said other electron-discharge device a signal of parabolic wave form but in opposite phase relative to said parabolic component of said unidirectional potential to compensate the effect of said component on said other discharge device.

4. A television receiver comprising: a vertical sweep output stage including an electron-discharge device, a load circuit and a source of unidirectional potential connected in series for translating a vertical deflection signal of pulsed sawtooth wave form through said load circuit, said potential source including a filter condenser which in response to said deflection signal has a tendency to superpose a component of parabolic wave form on said unidirectional potential; an AFC-controlled horizontal oscillator for varying the horizontal scanning frequency of said receiver in accordance with an applied AFC control signal and including another electron-discharge device having an anode coupled to said source and a control grid; means for applying an AFC control signal to the control grid of said other electron-discharge device; and an integrating network included in said load circuit for deriving therefrom and for applying to the control grid of said other electron-discharge device a signal of parabolic wave form but in opposite phase relative to said parabolic component of said unidirectional potential to compensate the effect of said component on said other discharge device.

References Cited in the file of this patent

UNITED STATES PATENTS 2,792,458 Good ------------------ May 14, 1957

OTHER REFERENCES

Rider's Television Manual, vol. 12, Westinghouse TV, page 12–11, copyrighted November 18, 1953.

Rider's Television Manual, vol. 13, RCA TV, page 13–48. Copyrighted September 27, 1954.